(12) United States Patent
Konyu et al.

(10) Patent No.: US 11,951,723 B2
(45) Date of Patent: Apr. 9, 2024

(54) ARMOR

(71) Applicants: Mike Konyu, Sun Lakes, AZ (US);
Robert Shivers, Mill Creek, WA (US);
Spiro Mitsanas, Vallejo, CA (US)

(72) Inventors: Mike Konyu, Sun Lakes, AZ (US);
Robert Shivers, Mill Creek, WA (US);
Spiro Mitsanas, Vallejo, CA (US)

( * ) Notice: Subject to any disclaimer, the term of this patent is extended or adjusted under 35 U.S.C. 154(b) by 0 days.

(21) Appl. No.: 17/327,563

(22) Filed: May 21, 2021

(65) Prior Publication Data
US 2021/0402731 A1 Dec. 30, 2021

Related U.S. Application Data

(63) Continuation of application No. 15/533,637, filed as application No. PCT/US2015/064828 on Dec. 9, 2015, now abandoned.
(Continued)

(51) Int. Cl.
*B32B 3/06* (2006.01)
*B32B 3/18* (2006.01)
(Continued)

(52) U.S. Cl.
CPC .................. *B32B 3/06* (2013.01); *B32B 3/18* (2013.01); *B32B 5/02* (2013.01); *B32B 5/06* (2013.01); *B32B 5/08* (2013.01); *B32B 5/26* (2013.01); *B32B 5/30* (2013.01); *B32B 7/12* (2013.01); *F41H 5/0435* (2013.01);
(Continued)

(58) Field of Classification Search
CPC .......... F41H 5/007; F41H 5/0492; F41H 1/02; F41H 5/0414; F41H 5/0442; F41H 5/0471; F41H 5/023; F41H 7/00; F41H 5/0457; F41H 5/0428; F41H 5/0435; F41H 5/0407; F41H 5/0485; F41H 1/04; F41H 5/04; F41H 5/0464; A41D 13/015; A41D 1/002; A41D 31/285; A41D 13/0518; B32B 5/02; B32B 3/12; B32B 15/04; B32B 37/12; B32B 17/10761; B32B 7/05; B32B 5/26; B32B 5/022; B32B 5/04; B32B 5/12; B32B 3/28; B32B 15/20; B32B 5/024; B32B 7/12; B32B 3/16; C23C 8/46
See application file for complete search history.

(56) References Cited

U.S. PATENT DOCUMENTS 5,361,678 A * 11/1994 Roopchand ............. C22C 32/00
89/36.02
5,364,679 A * 11/1994 Groves .................... B32B 3/10
428/76
(Continued)

OTHER PUBLICATIONS

Zeeospheres Ceramics, LLC, "Zeeospheres Ceramic Microspheres," (2009), Retrieved from the Internet <URL: http://www.zeeospheres.com/wp-content/uploads/2016/01/ZeeospheresMohsHardness.pdf>.

*Primary Examiner* — Lynda Salvatore
(74) *Attorney, Agent, or Firm* — DLA Piper LLP (US)

(57) ABSTRACT

The present invention relates to a flexible ballistic armor apparatus for deflecting high velocity firearm, fragmentation, or shrapnel projectiles with a flexible armor unit. The apparatus minimizes the deterioration of the armor when subjected to shock waves or shear forces of a ballistic impact. The present invention also relates to the use of a flexible armor unit with soft body armor, a vehicle, a vessel, an aircraft or in structural applications.

5 Claims, 4 Drawing Sheets

Related U.S. Application Data

(60) Provisional application No. 62/089,711, filed on Dec. 9, 2014.

(51) Int. Cl.

| | |
|---|---|
| *B32B 5/02* | (2006.01) |
| *B32B 5/06* | (2006.01) |
| *B32B 5/08* | (2006.01) |
| *B32B 5/26* | (2006.01) |
| *B32B 5/30* | (2006.01) |
| *B32B 7/12* | (2006.01) |
| *B32B 37/12* | (2006.01) |
| *F41H 5/04* | (2006.01) |

(52) U.S. Cl.
 CPC ............ *F41H 5/0492* (2013.01); *B32B 37/12* (2013.01); *B32B 2250/40* (2013.01); *B32B 2255/02* (2013.01); *B32B 2255/04* (2013.01); *B32B 2255/20* (2013.01); *B32B 2255/205* (2013.01); *B32B 2255/26* (2013.01); *B32B 2260/025* (2013.01); *B32B 2260/04* (2013.01); *B32B 2262/0253* (2013.01); *B32B 2262/0269* (2013.01); *B32B 2262/08* (2013.01); *B32B 2262/101* (2013.01); *B32B 2262/106* (2013.01); *B32B 2262/14* (2013.01); *B32B 2264/101* (2013.01); *B32B 2264/102* (2013.01); *B32B 2264/104* (2013.01); *B32B 2264/107* (2013.01); *B32B 2264/108* (2013.01); *B32B 2264/12* (2013.01); *B32B 2307/546* (2013.01); *B32B 2307/56* (2013.01); *B32B 2571/02* (2013.01)

(56) References Cited

U.S. PATENT DOCUMENTS

| | | | |
|---|---|---|---|
| 5,738,925 A | * | 4/1998 | Chaput ............... B32B 3/10 |
| | | | 428/101 |
| 7,478,579 B2 | | 1/2009 | Carberry et al. |
| 8,225,704 B2 | | 7/2012 | Ogrin et al. |
| 8,689,671 B2 | | 4/2014 | Hummel et al. |
| 2006/0065111 A1 | * | 3/2006 | Henry ............... F41H 5/0428 |
| | | | 89/36.02 |
| 2008/0307953 A1 | * | 12/2008 | Carberry ............ F41H 5/04 |
| | | | 89/36.02 |
| 2011/0174145 A1 | * | 7/2011 | Ogrin ............... C04B 35/053 |
| | | | 89/36.02 |
| 2012/0174747 A1 | * | 7/2012 | Hummel ............. F41H 5/0414 |
| | | | 89/36.02 |
| 2012/0318130 A1 | | 12/2012 | Genihovich et al. |
| 2014/0230638 A1 | * | 8/2014 | Waldrop ............. F41H 5/0428 |
| | | | 89/36.02 |

\* cited by examiner

ARMOR

CROSS-REFERENCE TO RELATED APPLICATIONS

This application is a Continuation of U.S. patent application Ser. No. 15/533,637, filed Jun. 6, 2017, now abandoned, which is a National Stage 371 application of PCT Application Ser. No. 15/64,828, filed Dec. 9, 2015, which claims benefit of priority under 35 U.S.C. § 119(e) of U.S. Ser. No. 62/089,711, filed Dec. 9, 2014, the entire contents of which is incorporated herein by reference in its entirety.

FIELD OF THE INVENTION

The present invention relates to an apparatus for deflecting high velocity firearm, fragmentation, or shrapnel projectiles with a flexible armor unit and uses thereof.

BACKGROUND OF THE INVENTION

Soft fabric ballistic resistant materials are typically formed from high-tensile strength fibers, such as aramid fibers and/or polyethylene fibers. Optimum projectiles are long and narrow. These fabric materials do not significantly alter the trajectory of the projectile and therefore fail to present the projectile's broadest body part to the fabric thereby reducing the fabric's ability to absorb the energy of the ballistic projectile and defeat the threat. Only a sphere has a constant rate of change of angle of incidence, providing the maximum ballistic deflection to an incoming ballistic threat.

Some mechanisms exist that overlap titanium or ceramic disks which spread the force more effectively to defeat some penetrating threats. Others use large, rigid, ceramic plates as shields. These large plates are heavy and inflexible, uncomfortable to use and cannot typically take multiple hits closer than 2 inches apart. The only competing flexible body armor utilizing ceramic disks having been criticized by the U.S. Army as not being bonded sufficiently to the aramid fabric resulting in catastrophic failure.

Additionally, the edges of these units are not rated as having threat defeating capability, and none of these mechanisms seek to optimize protective coverage while simultaneously reducing areal density. The Ball Armor insert is comprised of a sphere, which has the greatest ballistic threat defeating capability from attacks at all angles for areal density.

In view of the foregoing, it would be desirable to have a light-weight, flexible armoring system that would defeat high-velocity firearm projectiles, fragmentation and/or shrapnel, at varying angles of incidence

SUMMARY OF THE INVENTION

The present invention relates to a flexible ballistic armor apparatus for deflecting high velocity firearm, fragmentation, or shrapnel projectiles with a flexible armor unit. The apparatus minimizes the deterioration of the armor when subjected to shock waves or shear forces of a ballistic impact. The present invention also relates to the use of a flexible armor unit with soft body armor, a vehicle, a vessel, an aircraft or in structural applications.

Accordingly, in one embodiment, the present invention provides a flexible ballistic armor unit comprised of at least two spherical units, an inner envelope and an outer envelope. In one aspect, the spherical units are comprised of a fragmentation material. In another aspect, the fragmentation material is tempered amorphous silica, ceramic glass, ceramic or amorphous silica fiber infused with a liquid metal, quartz hardened graphene wrapped in ceramic/glass, silicon carbide, carbon/carbon composites, carbon/carbon/silicon carbide composites, boron carbide, aluminum oxide, silicon carbide particulate/aluminum metal matrix composites, quartz, feldspar, magnesium, graphene, graphene compounds or combinations thereof. In an additional aspect, the spherical unit is coated with a ceramic material. In certain aspects, the ceramic material is Barium titanate, strontium titanate, Bismuth strontium calcium copper oxide, Boron nitride, Earthenware, Ferrite, Lead zirconate titanate (PZT), Magnesium diboride (MgB2), Porcelain, Sialon (Silicon Aluminium Oxynitride), Silicon carbide (SiC), Silicon nitride (Si3N4), Steatite (magnesium silicates), Titanium carbide, Uranium oxide (UO2), Yttrium barium copper oxide (YBa2Cu3O7-x), Zinc oxide (ZnO), Zirconium dioxide (zirconia), partially stabilized zirconia (PSZ), pottery, brick, tile, cement, glass or combinations thereof. In a specific aspect, the ceramic material has a Mohs hardness scale range from about 4.5 to 6.5. In one aspect, the at least two spherical units are arranged along a horizontal axis. In another aspect, each spherical unit is the same size. In certain aspects, each spherical unit from about ⅛ inch to ⅞ inch. In a specific aspect, each spherical unit is ⅝ inch. In one aspect, the at least two spherical units are encased in the inner envelope. In an additional aspect, the inner envelope is comprised of at least one layer of a non-ballistic fabric. In a further aspect, the non-ballistic fabric is cotton, polyester or cotton-polyester. In a specific aspect, the non-ballistic fabric is cotton. In another aspect, the inner envelope is sealed by ballistic thread. In one aspect, the inner envelope is encased in the outer envelope. In another aspect, the outer envelope is comprised of at least two layers of a fibrous fabric. In an additional aspect, the fibrous fabric is carbon fiber, fiberglass, aramid fiber, ultra-high molecular weight polyethylene, liquid crystal polymers, or a combination thereof. In a further aspect, the aramid fabric is an ultra-high molecular weight polyethylene fiber.

In an additional embodiment, the present invention provides a flexible ballistic armor apparatus comprised of at least two flexible ballistic armor units. In one aspect, each flexible ballistic armor unit is arranged parallel to at least one flexible ballistic armor unit. In another aspect, the flexible ballistic armor units are offset by 0-100% of the radius of a spherical unit. In an additional aspect, the flexible ballistic units are offset by 100% of the radius of a spherical unit such that the spherical units generally form a diamond pattern. In a further aspect, the at least two flexible ballistic armor units are attached by ballistic thread. In one aspect, the apparatus further comprises at least one layer of a fibrous fabric. In an additional aspect, the fibrous fabric is aramid fiber. In a further aspect, the aramid fabric is coated with graphene.

In a further embodiment, the present invention provides, a method of preventing penetration of high velocity firearm, fragmentation projectiles or shrapnel projectiles comprising providing at least two flexible ballistic armor units, each armor unit comprising at least two spherical units, an inner envelope and an outer envelope. In one aspect, the spherical units are encased by the inner envelope. In another aspect, the inner envelop is encased in an outer envelope. In an additional aspect, the spherical units are comprised of a fragmentation material. In a further aspect, the material is selected from the group consisting of tempered amorphous silica, ceramic glass, ceramic or amorphous silica fiber infused with a liquid metal, quartz hardened graphene wrapped in ceramic/glass, silicon carbide, carbon/carbon composites, carbon/carbon/silicon carbide composites, boron carbide, aluminum oxide, silicon carbide particulate/aluminum metal matrix composites, and combinations thereof. In one aspect, the spherical unit is coated with a ceramic material. In another aspect, the spherical units are arranged along a horizontal axis. In another aspect, each spherical unit from about ⅛ inch to about ⅞ inch. In a specific aspect, each spherical unit is ⅝ inch. In a further aspect, the at least two spherical units is encased in the inner envelope. In certain aspects, the inner envelope is comprised of a non-ballistic fabric. In an additional aspect, the outer envelope is comprised of at least two layers of a fibrous fabric. In certain aspects, the fibrous fabric carbon fiber, fiberglass, aramid fiber, ultra high molecular weight polyethylene, liquid crystal polymers, or a combination thereof. In a specific aspect, the fibrous fabric is an ultra-high molecular weight polyethylene fiber. In one aspect, the flexible ballistic armor apparatus further comprises at least one layer of a fibrous fabric. In another aspect, the fibrous fabric is aramid fiber. In a specific aspect, the aramid fabric is coated with a graphene. In an additional aspect, the flexible ballistic armor apparatus further comprises body armor. In certain aspects, the body armor is comprised of a ballistic fabric. In a further aspect, the at least two flexible ballistic armor apparatuses are positioned within a vehicle, a vessel, an aircraft or a structure. In one aspect, the high velocity firearm, fragmentation projectiles or shrapnel projectiles impact the flexible armor unit causing the high velocity firearm, fragmentation or shrapnel projectiles to change direction and change the force vector resulting in the high velocity firearm, fragmentation or shrapnel projectiles to turn an oblique position relative to the plane of the flexible armor unit. In an additional aspect, the spherical units fragment forming an abrasive material. In another aspect, the force of the high velocity firearm, fragmentation projectiles or shrapnel projectiles causes the spherical units to strikes adjacent spherical units transferring kinetic energy. In a further aspect, the force of the high velocity firearm, fragmentation projectiles or shrapnel projectiles causes the outer envelope to contact an adjacent outer envelope dissipating kinetic energy vertically. In one aspect, a first flexible armor unit contacts a second armor unit dissipating kinetic energy upon impact. In an additional aspect, the fibrous fabric of the outer envelope absorbs kinetic energy. In a further aspect, the fragmentation of the spherical units lowers the kinetic energy of the projectile.

DETAILED DESCRIPTION

Figure 1:
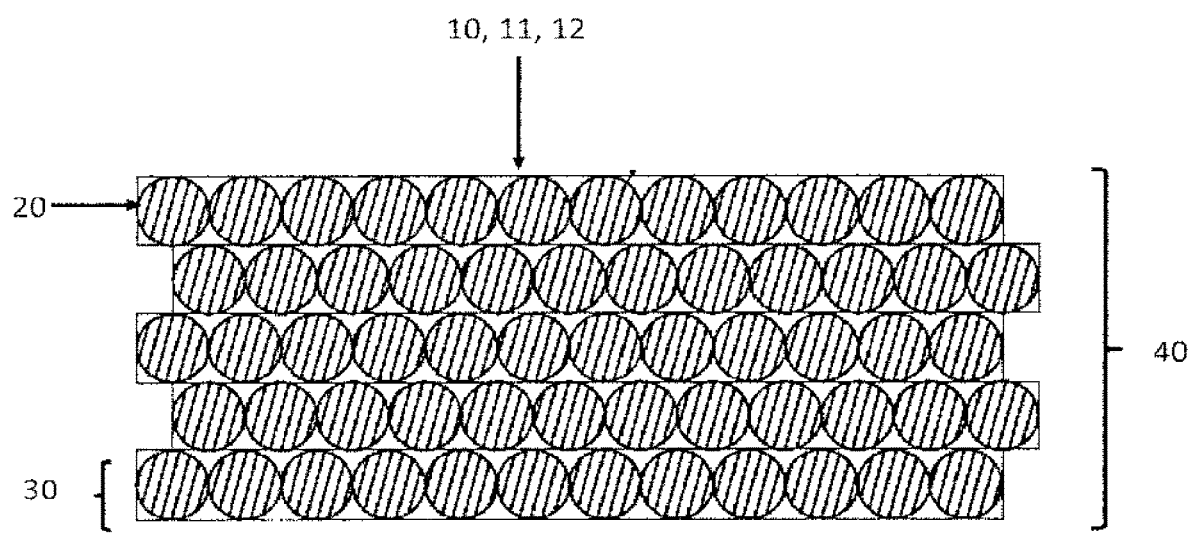
FIG. 1 shows a schematic diagram of the front view of the flexible ballistic armor apparatus 40 comprising multilayers of a flexible ballistic armor unit 30. Each ballistic armor apparatus 40 is comprised of at least one flexible armor unit 30. Each flexible ballistic armor unit 30 is comprised of multiple spherical units 20, an inner envelope 12 and an outer envelope 10.

The present invention relates to a flexible ballistic armor apparatus 40 for deflecting high velocity firearm, fragmentation, or shrapnel projectiles with a flexible armor unit 30. The apparatus minimizes the deterioration of the armor when subjected to shock waves or shear forces of a ballistic impact. The present invention also relates to the use of a flexible armor unit 30 with soft body armor, a vehicle, a vessel, an aircraft or in structural applications.

Before the present compositions and methods are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

As used herein "aramid fiber" refers to a class of heat-resistant and strong synthetic fibers. They are used in aerospace and military applications, for ballistic rated body armor fabric and ballistic composites, in bicycle tires, and as an asbestos substitute. They are fibers in which the chain molecules are highly oriented along the fiber axis, so the strength of the chemical bond can be exploited.

As used herein "body armor" refers to the whole of protective clothing, designed to absorb and/or deflect slashing, bludgeoning, and penetrating attacks. Two types exist: regular non-plated personal armor (used by the people mentioned above, except combat soldiers) and hard-plate reinforced personal armor, which is used by combat soldiers, police tactical units and hostage rescue teams. Kevlar™ is well known as a component of some bullet resistant vests and bullet resistant face masks. The PASGT helmet and vest used by United States military forces since the early 1980s both have Kevlar™ as a key component, as do their replacements. Other military uses include bullet resistant facemasks used by sentries. Civilian applications include Kevlar™ reinforced clothing for motorcycle riders to protect against abrasion injuries. Kevlar™ in non-woven long strand form is used inside an outer protective cover to form chaps that loggers use while operating a chainsaw. If the moving chain contacts and tears through the outer cover, the long fibers of Kevlar™ tangle, clog, and stop the chain from moving as they get drawn into the workings of the drive mechanism of the saw. Kevlar™ is used also in Emergency Service's protection gear if it involves high heat (e.g., tackling a fire), and Kevlar™ such as vests for police officers, security, and SWAT. The latest Kevlar™ material that DuPont has developed is Kevlar™ XP. In comparison with 'normal' Kevlar™, Kevlar® XP is more light-weight and more comfortable to wear, as it is quilt stitch is not required for the ballistic package. Another fiber used to manufacture a bullet resistant vest is Dyneema®. Originated in the Netherlands, Dyneema®, a polyethylene fiber has an extremely high strength-to-weight ratio (a 1-mm-diameter rope of Dyneema® can bear up to a 240-kg load), is light enough that it can float on water, and has high energy absorption characteristics.

As used herein, the term "impact or penetration from a high velocity firearm, fragmentation projectile or shrapnel projectile" refers to penetration or impact from ammunition fired from a firearm, including but not limited to hand guns, submachine guns, high powered rifles, armor piercing rifles and the like; fragmentation and shrapnel projectiles from IEDs, bombs and the like; projectiles from explosives (PLEASE ADD MORE). The ammunition are generally known in the art but includes, but is not limited to, 12 gauge 00 buckshot, 12 gauge slug/sabat, 45 auto, .38 special, 9 mm, 40 CAL, 7.62 MM, 5.56 MM, .223 CAL, 30.06 CAL, and .30 CAL. Standards for testing ballistic resistant material are set out by the U.S. Department of Justice (NIJ Standard 0108.01) and are detailed in the Examples.

A flexible ballistic armor unit 30 comprises at least two spherical units 20 disposed within an inner envelope 12 and an outer envelope 10. Spherical units 20 are comprised of a fragmentation material. The fragmentation material is designed to come apart or fragment upon impact. Examples of fragmentation material include, but are not limited to, tempered amorphous silica, ceramic glass, ceramic or amorphous silica fiber infused with a liquid metal, quartz hardened graphene wrapped in ceramic/glass, silicon carbide, carbon/carbon composites, carbon/carbon/silicon carbide composites, boron carbide, aluminum oxide, silicon carbide particulate/aluminum metal matrix composites, quartz, feldspar, magnesium, graphene, graphene compounds and combinations thereof. In some aspects, the spherical unit comprises a core of a fragmentation material which is coated with a ceramic material. Examples of ceramic materials include, but are not limited to, Barium titanate, strontium titanate, Bismuth strontium calcium copper oxide, Boron nitride, Earthenware, Ferrite, Lead zirconate titanate (PZT), Magnesium diboride (MgB2), Porcelain, Sialon (Silicon Aluminium Oxynitride), Silicon carbide (SiC), Silicon nitride (Si3N4), Steatite (magnesium silicates), Titanium carbide, Uranium oxide (UO2), Yttrium barium copper oxide (YBa2Cu3O7-x), Zinc oxide (ZnO), Zirconium dioxide (zirconia), partially stabilized zirconia (PSZ), pottery, brick, tile, cement, glass and combinations thereof.

Ceramic material are often described in terms of hardness using the Mohs scale. The Mohs scale of mineral hardness is a qualitative ordinal scale that characterizes the scratch resistance of various minerals through the ability of a harder material to scratch a softer material. The Mohs scale of mineral hardness is based on the ability of one natural sample of mineral to scratch another mineral visibly. The samples of matter used by Mohs are all different minerals. Minerals are pure substances found in nature. Rocks are made up of one or more minerals. As the hardest known naturally occurring substance when the scale was designed, diamonds are at the top of the scale. The hardness of a material is measured against the scale by finding the hardest material that the given material can scratch, and/or the softest material that can scratch the given material. For example, if some material is scratched by apatite but not by fluorite, its hardness on the Mohs scale would fall between 4 and 5. "Scratching" a material for the purposes of the Mohs scale means creating non-elastic dislocations visible to the naked eye. Frequently, materials that are lower on the Mohs scale can create microscopic, non-elastic dislocations on materials that have a higher Mohs number. While these microscopic dislocations are permanent and sometimes detrimental to the harder material's structural integrity, they are not considered "scratches" for the determination of a Mohs scale number.

In various embodiments, the ceramic material has a Mohs hardness scale range from about 4.5 to 6.5, for example 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, or 6.5. Additionally, other materials may be used having any Mohs hardness value in combination with those ceramic materials having a Mohs hardness scale range from about 4.5 to 6.5.

The spherical units 20 are arranged linearly within inner envelopes 12 and outer envelopes 10 along a horizontal axis. The number of spherical units ranges from at least about 2-5000 or greater depending on the usage. For example, the number of spherical units may be 2, 3, 4, 5, 6, 7, 8, 9, 20, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 125, 150, 175, 200, 225, 250, 275, 300, 325, 350, 375, 400, 425, 450, 475, 500, 550, 600, 650, 700, 750, 800, 850, 900, 950, 1000, 1250, 1500, 1750, 2000, 2500, 3000, 3500, 4000, 4500, 5000 or greater. The spherical units 20 of a flexible ballistic armor unit 30 are the same size. The spherical units 20 range from at least about ⅛ inch to 3 inches or greater. For example, the spherical units may be 1, ⅛, ⅜, ⅝, ⅝, ⅝, ⅞, 1, 1⅛, 1¼, 1⅜, 1½, 1⅝, 1¾, 1⅞, 2, 2⅛, 2¼, 2⅜, 2½, 2⅝, 2¾, 2⅞, 2⅛, 2¼, 2⅜, 2½, 2⅝, 2¾, 2⅞, 3, 3 inches or greater.

The spherical units 20 are encased in an inner envelope 12. The inner envelope 12 is comprised of at least one layer of a non-ballistic fabric. The inner envelope 12 may comprise 1, 2, 3, 4, 5, 6, 7, 8, 9, 10, 11, 12, 13, 14, 15, 20, 25 or more layers of a non-ballistic fabric. Non-ballistic fabric is essentially any fabric not used for ballistic purposes. Examples of the non-ballistic fabric include, but are not limited to, cotton, polyester and cotton polyester. The non-ballistic fabric allows the spherical units 20 to fragment upon impact with a high velocity firearm, fragmentation projectile or shrapnel projectile which causes the spherical units to form an abrasive material and transfer kinetic energy to adjacent spherical units 20.

The inner envelope 12 is encased by an outer envelope 10. The outer envelope 10 is comprised of at least 2 layers of a fibrous fabric. In some aspects, the outer envelope 10 is comprised of 2, 3, 4, 5, 6, 7, 8, 9, 10, 15, 20, 25, 30, 35, 40, 45, 50 or more layers of a fibrous fabric. Examples of the fibrous fabric include, but are not limited to, carbon fiber, fiberglass, aramid fiber, ultra-high molecular weight polyethylene, liquid crystal polymers, or combinations thereof. Aramid fibers are a class of heat-resistant and strong synthetic fibers. They are fibers in which the chain molecules are highly oriented along the fiber axis, so the strength of the chemical bond can be exploited. Aramid fibers have good resistance to abrasion, good resistance to organic solvents, nonconductive, no melting point, degradation starts from 500° C., low flammability, good fabric integrity at elevated temperatures, sensitive to acids and salts, sensitive to ultraviolet radiation and prone to electrostatic charge build-up unless finished. Examples of aramid fibers include Kevlar™, Technora®, Twaron®, Heracron®, Nomex®, Innegra S®, Nylon, Textile, UHMWPE and Vectran®. Ultra-high-molecular-weight polyethylene (UHMWPE, UHMW) is a subset of the thermoplastic polyethylene. Also known as high-modulus polyethylene, (HMPE), or high-performance polyethylene (HPPE), it has extremely long chains, with a molecular mass usually between 2 and 6 million units. The longer chain serves to transfer load more effectively to the polymer backbone by strengthening intermolecular interactions. This results in a very tough material, with the highest impact strength of any thermoplastic presently made. Examples of UHMWPE include but are not limited to, Dyneema® and Spectra®.

Between the inner envelope 12 and outer envelope 10 is an optional adhesive layer 11. The adhesive layer 11 is comprised of epoxy phenolic resin, vinyl ester resin, ultraviolet curing resins, thermoplastic resin, thermoset resin, polyethylene, ionomer resin, polypropylene, carbon fiber reinforced polyphenylene sulfide anti-ballistic resin, polyurea, polyurethane, or combinations thereof. The adhesive layer 11 may optionally include nano particle fillers. The inner envelopes 12 and outer envelopes 10 are sealed by stitching using ballistic thread 13. Ballistic thread 13 is comprised of aramid fiber including UHMWPE. Examples of ballistic thread include Kevlar™ and Spectra®.

A flexible ballistic armor apparatus 40 is comprised of at least two flexible ballistic armor units 30. The flexible ballistic armor units 30 may range from about 2 to 500 or more. For example, a flexible ballistic armor apparatus 40 may be about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, 70, 75, 80, 85, 90, 95, 100, 125, 150, 175, 200, 225, 250, 275, 300, 350, 400, 450, 500 or more flexible ballistic armor units 30. The flexible ballistic armor units 30 are arranged parallel to one another. The flexible ballistic armor units 30 may be offset from one another. For example, the flexible ballistic armor units 30 may be offset from about 0% to 100% of the radius of a spherical unit 20. For example, the flexible ballistic armor units 30 may be offset by 0%, 5%, 10%, 15%, 20%, 25%, 30%, 35%, 40%, 45%, 50%, 55%, 60%, 65%, 70%, 75% 80%, 85%, 90%, 95% or 100% of the radius of a spherical unit 20. Thus the spherical units 20 generally form a diamond pattern with respect to one another, the diamonds having internal angles between sides that vary in accordance with the offset. The flexible ballistic armor units 30 are attached to one another using ballistic thread 13. The flexible ballistic apparatus 40 may additionally comprise at least one layer of a fibrous fabric 50. In certain aspects, the flexible ballistic apparatus 40 may comprise 1, 2, 3, 4, 5, 6, 7, 8, 9, 10, 11, 12, 13, 14, 15, 16, 17, 18, 19, 20, 25, 30 or more layers of a fibrous fabric 50. Examples of the fibrous fabric include, but are not limited to, carbon fiber, fiberglass, aramid fiber, ultra-high molecular weight polyethylene, liquid crystal polymers, or combinations thereof. The fibrous fabric may be an aramid fiber. Aramid fibers are a class of heat-resistant and strong synthetic fibers. They are fibers in which the chain molecules are highly oriented along the fiber axis, so the strength of the chemical bond can be exploited. Aramid fibers have good resistance to abrasion, good resistance to organic solvents, nonconductive, no melting point, degradation starts from 500° C., low flammability, good fabric integrity at elevated temperatures, sensitive to acids and salts, sensitive to ultraviolet radiation and prone to electrostatic charge build-up unless finished. Examples of aramid fibers include Kevlar™, Technora®, Twaron®, Heracron®, Nomex®, Innegra S®, Nylon, Textile, UHMWPE and Vectran®. Ultra-high-molecular-weight polyethylene (UHMWPE, UHMW) is a subset of the thermoplastic polyethylene. Also known as high-modulus polyethylene, (HMPE), or high-performance polyethylene (HPPE), it has extremely long chains, with a molecular mass usually between 2 and 6 million units. The longer chain serves to transfer load more effectively to the polymer backbone by strengthening intermolecular interactions. This results in a very tough material, with the highest impact strength of any thermoplastic presently made. Examples of UHMWPE include but are not limited to, Dyneema® and Spectra®. Additionally, the at least one layer of fibrous fabric may be coated with a material to strengthen the fibrous fabric. This material may be graphene.

The flexible ballistic armor apparatus 40 can be used to prevent the penetration of a high velocity firearm, fragmentation projectiles or shrapnel projectiles. This method requires providing at least two flexible ballistic armor units 30 as described herein.

The flexible ballistic armor apparatus 40 can be used to prevent the penetration of a high velocity firearm, fragmentation projectiles or shrapnel projectiles. This method comprises providing at least two flexible ballistic armor units 30, each flexible ballistic armor unit 30 comprising at least two spherical units 20, an inner envelope 12 and an outer envelope 10. The at least two spherical units 20 are arranged laterally along a horizontal axis and encased in the inner envelope 12 comprised of a non-ballistic fabric. The inner envelope 12 is encased in the outer envelope 10 comprised of at least two layers of fibrous fabric. The flexible ballistic armor units 30 are arranged parallel to one another and attached to one another with ballistic thread 13. The flexible ballistic armor apparatus 40 may further comprise a fibrous fabric 50. This fibrous fabric 50 may optionally be coated with a material to strengthen the fabric. The material may be graphene. The flexible ballistic armor apparatus 40 may further comprise body armor comprised of ballistic fabric. The flexible ballistic armor apparatuses 40 may be placed with any object, vehicle or structure to prevent the penetration of a high velocity firearm, fragmentation projectiles or shrapnel projectiles. For example, the flexible ballistic armor apparatuses may be placed within a shield; a shirt, vest, coat, pants, hat, helmet, scarf, glove, shoe, boot, sock, suit or other item of clothing; car, truck, jeep, ship, airplane, motorcycle or other vessel; a wall, a floor, a ceiling, partition or any part of a structure; desk, chair, coach/sofa, table, bookcase, bed, dresser or piece of furniture; suitcase, purse, briefcase, attache case, or trunk.

Upon impact or penetration from a high velocity firearm, fragmentation projectile or shrapnel projectile the spherical units fragment forming an abrasive material dissipating and lowering the kinetic energy from the high velocity firearm, fragmentation projectile or shrapnel projectile in all directions. Additionally, impact or penetration from a high velocity firearm, fragmentation projectile or shrapnel projectile causes the spherical units 20 to strike adjacent spherical units 20 transferring and dissipating kinetic energy from the high velocity firearm, fragmentation projectile or shrapnel projectile. Further, the impact or penetration from a high velocity firearm, fragmentation projectile or shrapnel projectile to contact an adjacent outer envelope 10 dissipating kinetic energy vertically and wherein the fibrous fabric of the outer envelope 10 absorbs kinetic energy. The flexible ballistic armor apparatus 40 grabs the projectile creating drag and causes transverse force vector redirection from the initial flight path resulting in the projectile turning on an axis to present a side aspect to the balls allowing the projectiles to spin into the disintegrating spherical units 20. The disintegrating spherical units 20 becomes an abrasive material that grinds the metal projectile into smaller particles such as when sandpaper is used on a material. The result is complete or nearly complete destruction of the projectile leaving primarily a granular substance like metal filings or a powder. This abrasive action complements the force vector dissipation. Two separate actions to obtain the final results: projectile destruction and force dissipation.

The following examples are provided to further illustrate the embodiments of the present invention, but are not intended to limit the scope of the invention. While they are typical of those that might be used, other procedures, methodologies, or techniques known to those skilled in the art may alternatively be used.

Example 1

At a test in the Central Florida area, two flexible plate units, both composed of non-tempered amorphous silica spherical units which were encased by bonded sheets each of 3000 denier Aramid fiber and combined with layers of Honeywell Spectra Shield™ ultra-high molecular weight polyethylene and resins that exhibit high resistance to chemicals, water, and ultraviolet light. The physical structure has excellent vibration damping, flex fatigue and internal fiber-friction characteristics allowing the application of the physical actions causing the destruction of the threat with virtual dissipation of all trauma. This armor panel was sufficient to destroy 150 grain full metal jacket .308 cal ball ammunition, 7.62 mm and 5.56 cal. ball and armor piercing ammunition and 0.12 gauge 3" shotgun Sabot. When the threat struck the first sphere, the threat became misshapen and unstable causing the threat to lose energy and continue spinning through the abrasive materials caused by the destruction of the spheres. As the threat moved into the second panel of spheres, it continued to spin through the abrasive material created by the destruction of the adjacent spheres resulting in nearly complete destruction of the threat. As the threat strikes the spheres, energy is transferred to the adjacent spheres which move the force vector to the edges of the panel in all directions away from the initial entry point into the panel. The sewn edges create a barrier to the rows of spheres so that each sphere bounces back on the spheres adjacent and back to the point of penetration resulting in a "reverberation" of energy creating a dampening effect. The dampening effect is across the panel, and not from front to back thereby reducing back-face trauma and injury or damage. During flight, the threat spins and yaws. As it strikes the curved face of the sphere in the armor panel, panel several actions begin to occur.

The threat begins to change direction while the force vector changes as well. This causes the threat to turn to an oblique position relative to the plane of the panel.

The sphere begins to come apart forming an abrasive material acting like sandpaper.

When the threat strikes the face of the armor panel, it strikes a ball that then strikes the next ball beside it transferring its kinetic energy to it. That energy is transferred along the stationary balls which are in contact with each other. When this energy reaches the remaining ball at the closed end, it comes back on itself as a wave strikes a wall resulting in energy losses in the system.

The spheres of the front panel begin to strike the adjacent spheres of the back panel causing the same transfer of energy to the set of spheres in that panel.

The energy transfer and loss was the result of the high impact force between the balls causing the materials to permanently deform and disintegrate. The deforming materials absorb significant amounts energy, which in turn lowers kinetic energy in the system.

The armor used in the test shoot was a 24 inch (h) by 24 inch (w) by 1½ inch (d) panel consisting of the following: The face was 4 layers of Kevlar™, a para-aramid fiber. Two pieces of Kevlar™ were joined using an adhesive to form one piece. A second 2 panel piece was placed behind the first panel. Then, two pieces of cotton fabric were sewn together using horizontal stitching to form ⅝" "tubes" which were then filled with ⅝' glass marbles. The ends of each tube were sewn closed, thereby encasing the horizontal row of marbles. The finished product was 38 rows of tubing in a horizontal manner (38 rows horizontal and 38 rows vertical to form a square). A second cotton panel of marbles constructed in exactly the manner was placed behind the first set of marbles and allowed to "nest" so that the back panel allowed the marbles to nestle into the natural depressions formed by the pattern. Twelve layers of Spectra Shield™ ballistic fabric panels are placed behind the marble pouches. (Spectra Shield™ is a thin, flexible ballistic composite made from two layers of unidirectional fibers held in place by flexible resins. These fibers are arranged so they cross each other at 0 and 90 degree angles, then, both fiber and resin layers are sealed between two thin sheets of polyethylene film similar to saran wrap). All layers are stitched together with Kevlar™ thread at the perimeter to form a single panel. This panel was placed into an envelope, or "carrier" constructed of non-ballistic cotton fabric for the test in the same manner that the finished product would be placed into an outer container for protection and use.

Example 2

Standards and Testing for Ballistic Resistant Protective Materials

FOREWORD: This document, NU standard-0108.01, Ballistic Resistant Protective Materials, is an equipment Standard developed by the Law Enforcement Standards Laboratory of the National Bureau of Standards. It is produced as part of the Technology Assessment Program of the National Institute of Justice (NIJ). A brief description of the program appears on the inside front cover.

PURPOSE: The purpose of this standard is to establish minimum performance requirements and methods of test for ballistic resistant protective materials. This standard supersedes NIJ Standard-0108.00, Ballistic Resistant Protective Materials, dated December 1981. This revision adds threat level III-A and establishes threat level classifications that are consistent with other NIJ standards for ballistic protection.

2. Scope and Classification 2.1 Scope: This standard is applicable to all ballistic resistant materials (armor) intended to provide protection against gunfire, with the exception of police body armor and ballistic helmets, which are the topic of individual NIJ performance standards [1,2][1]. Many different types of armor are now available that range in ballistic resistance from those designed to protect against small-caliber handguns to those designed to protect against high-powered rifles. Ballistic resistant materials are used to fabricate portable ballistic shields, such as a ballistic clipboard for use by a police officer; to provide ballistic protection for fixed structures such as critical control rooms or guard stations; and to provide ballistic protection for the occupants of vehicles. The ballistic resistant materials used to fabricate armor include metals, ceramics, transparent glazing, fabric, and fabric-reinforced plastics; they are used separately or in combination, depending upon the intended threat protection.

The ballistic threat posed by a bullet depends, among other things, on its composition, shape, caliber, mass, and impact velocity. Because of the wide variety of cartridges available in a given caliber, and because of the existence of hand loads, armors that will defeat a standard test round may not defeat other loadings in the same caliber. For example, an armor that prevents penetration by a 357 Magnum test round may or may not defeat a 357 Magnum round with a higher velocity. Similarly, for identical striking velocities, nondefonning or armor-piercing rounds pose a significantly greater penetration threat than an equivalent lead core round of the same caliber. The test ammunitions specified in this standard represent common threats to the law enforcement community.

2.2 Classification: Ballistic resistant protective materials covered by this standard are classified into five types, by level of performance.

2.2.1 Type 1 (22 LR; 38 Special) This armor protects against the standard test rounds as defined in section 5.2.1. It also provides protection against lesser threats such as 12 gauge No. 4 lead shot and most handgun rounds in calibers 25 and 32.

2.2.2 Type II-A (Lower Velocity 357 Magnum; 9 mm) This armor protects against the standard test rounds as defined in section 5.2.2. It also provides protection against lesser threats such as 12 gauge 00 buckshot, 45 Auto., 38 Special±P and some other factory loads in caliber 357 Magnum and 9 mm, as well as the threats mentioned in section 2.2.1.

2.2.3 Type II (Higher Velocity 357 Magnum; 9 mm): This armor protects against the standard test rounds as defined in section 5.2.3. It also provides protection against most other factory loads in caliber 357 Magnum and 9 mm, as well as threats mentioned in section 2.2.1 and 2.2.2.

2.2.4 Type HI-A (44 Magnum; Submachine Gun 9 mm): This armor protects against the standard test rounds as defined in section 5.2.4. It also provides protection against most handgun threats as well as the threats mentioned in sections 2.2.1 through 2.2.3.

2.2.5 Type HI (High-Powered Rifle): This armor protects against the standard test round as defined in section 5.2.5. It also provides protection against most lesser threats such as 223 Remington (5.56 mm FMJ), 30 Carbine FMJ, and 12 gauge rifle slug, as well as the threats mentioned in sections 2.2.1 through 2.2.4.

2.2.6 Type IV (Armor-Piercing Rifle): This armor protects against the standard test round as defined in section 5.2.6. It also provides at least single hit protection against the threats mentioned in sections 2.2.1 through 2.2.5.

2.2.7 Special Type: A purchaser having a special requirement for a level of protection other than one of the above standards should specify the exact test rounds to be used, and indicate that this standard shall govern in all other respects.

3. Definitions 3.1 Angle of Incidence: The angle between the line of flight of the bullet and the perpendicular to the plane tangent to the point of impact (see FIG. 1). Also known as angle of obliquity 3.2 Fair Hit: A hit that impacts the ballistic resistant protective material at an angle of incidence no greater than 5°, and is at least 5 cm (2 in) from a prior hit or the edge of the test specimen and at an acceptable velocity as defined in this standard. A bullet that impacts too close to the edge or a prior hit and/or at too high a velocity, but does not penetrate, shall be considered a fair hit for the determination of non-penetration.

3.3 Full Metal Jacketed (FMJ) Bullet: A bullet made of lead completely covered, except for the base, with copper alloy (approximately 90 copper-10 zinc).

3.4 Jacketed Soft Point (JSP) Bullet: A bullet made of lead completely covered, except for the point, with copper alloy (approximately 90 copper-10 zinc).

3.5 Lead Bullet: A bullet made of lead alloyed with hardening agents.

3.6 Penetration: Perforation of a witness plate by any part of the test specimen or test bullet, as determined by passage of light when held up to a 60-W light bulb.

3.7 Strike Face: The surface of a ballistic resistant protective material designated by the manufacturer as the surface that should be exposed to (face) the weapon threat.

3.8 Semi-wadcutter: A bullet shape characterized by a flat nose and a tapered section leading to a cylindrical bullet body with a sharp break where the taper meets the body.

3.9 Witness Plate: A thin sheet of aluminum alloy placed behind a test specimen to determine the potential for an incapacitating injury.

4. Requirements 4.1 Acceptance Criteria: A ballistic material satisfies the requirements of this standard if the sample item (see sec. 5. meets the requirements of sections 4.2 through 4.4.

4.2 Workmanship: Ballistic resistant protective materials shall be free from dents, blisters, cracks, crazing, chipped or sharp corners, and other evidence of inferior workmanship.

4.3 Labeling: The Sample item and each full size panel of ballistic resistance material shall be permanently and legibly labeled and shall include the following information. Name, designation, or logo of the manufacturer a) Type of material, according to section 2 of this standard
b) Month and year of manufacture
c) Lot number
d) Strike face, if any
e) Certification of compliance with this edition of this standard Items c and d may be incorporated into a single number, e.g., a Serial number.

4.4 Ballistic Resistance: The ballistic resistance of each test specimen of ballistic resistant protective material shall be determined in accordance with section 5.3. The test weapon and ammunition used during this test shall be those specified in table 1 in accordance with the type (threat level rating) specified by the manufacturer (sec. 4.3). Any penetration of the witness plate shall constitute failure. The ballistic resistance test variables and test requirements are presented in table 1.

TABLE 1

Test Summary
Test Variables Performance Requirements

| Armor Type | Test Ammunition | Nominal Bullet Mass | Suggested Barrel Length | Required Bullet Velocity | Required Hits Per Armor | Permitted Penetrations |
|---|---|---|---|---|---|---|
| I | 22 LRHV Lead | 2.6 g / 40 gr | 15 to 16.5 cm / 6 to 6.5 in | 320 ± 12 m/s / 1050 ± 40 ft/s | 5 | 0 |
|  | 38 Special RN Lead | 10.2 g / 158 gr | 15 to 16.5 cm / 6 to 6.5 in | 259 ± 15 m/s / 850 ± 50 ft/s | 5 | 0 |
| II-A | 357 Magnum JSP | 10.2 g / 158 gr | 10 to 12 cm / 4 to 4.75 in | 381 ± 15 m/s / 1250 ± 50 ft/s | 5 | 0 |
|  | 9 mm FMJ | 8.0 g / 124 gr | 10 to 12 cm / 4 to 4.75 in | 332 ± 12 m/s / 1090 ± 40 ft/s | 5 | 0 |
| 11 | 357 Magnum JSP | 10.2 g / 158 gr | 15 to 16.5 cm / 6 to 6.5 in | 425 ± 15 m/s / 1395 ± 50 ft/s | 5 | 0 |
|  | 9 mm FMJ | 8.0 g / 124 gr | 10 to 12 cm / 4 to 4.75 in | 358 ± 12 m/s / 1175 ± 40 ft/s | 5 | 0 |
| III-A | 44 Magnum Lead SWC Checked | 15.55 g / 240 gr | 14 to 16 cm / 5.5 to 6.25 in | 426 ± 15 m/s / 1400 ± 50 ft/s | 5 | 0 |
|  | 9 mm FMJ | 8.0 g / 124 gr | 24 to 26 cm / 9.5 to 10.25 in | 426 ± 15 m/s / 1400 ± 50 ft/s | 5 | 0 |
| III | 7.62 mm 308 FMJ | 9.7 g / 150 gr | 56 cm / 22 in | 838 ± 15 m/s / 2750 ± 50 ft/s | 5 | 0 |
| IV | 30-06 AP | 10.8 g / 166 gr | 56 cm / 22 in | 868 ± 15 m/s / 2850 ± 50 ft/s | 1 | 0 |
| Special Requirement | • |  |  |  |  |  |

* These items must be specified by the user. All of the
Abbreviations:
AP—Armor Piercing
FMJ—Full Metal Jacket
JSP—Jacketed Soft Point
LRHV—Long Rifle High Velocity
RN—Round Nose
SWC—Semi-Wadcutter

5. Test Methods 5.1 Sampling: The test specimen shall be a current production sample of the ballistic resistant material at least 30.5×30.5 cm (12×12 in).

5.2 Test Equipment: It should be noted that hand-loaded ammunition may be required to achieve some of the bullet velocities required in the following sections.

5.2.1 Type I Test Weapons and Ammunition 5.2.1.1 22 LR: The test weapon may be a 22-caliber handgun or test barrel. The use of a handgun with a 10 to 12 cm (6 to 6.5 in) barrel is suggested. Test bullets shall be 22 Long Rifle High Velocity lead, with nominal masses of 2.6 g (40 gr) and measured velocities of 320±12 m (1050±40 ft) per second.

5.2.1.2 38 Special: The test weapon may be a 38 Special handgun or test barrel. The use of a handgun with a 15 to 16.5 cm (6 to 6.5 in) barrel is suggested. Test bullets shall be 38 Special round-nose lead, with nominal masses of 2.6 g (158 gr) and measured velocities of 259±15 m (850±50 ft) per second.

5.2.2 Type II-A Test Weapons and Ammunition 5.2.2.1 Lower Velocity 357 Magnum: The test weapon may be a 357 Magnum handgun or test barrel. The use of a handgun with a 10 to 12 cm (4 to 4.75 in) barrel is suggested. Test bullets shall be 357 Magnum jacketed soft point, with nominal masses of 10.2 g (158 gr) and measured velocities of 381±15 m (1250±50 ft) per second.

5.2.2.2 Lower Velocity 9 mm: The test weapon may be a 9 mm handgun or test barrel. The use of a handgun with a 10 to 12 cm (4 to 4.75 in) barrel is suggested. Test bullets shall be 9 mm full metal jacketed, with nominal masses of 8.0 g (124 gr) and measured velocities of 332±12 m (1090±40 ft) per second.

5.2.3.1 Higher Velocity 357 Magnum: The test weapon may be a 357 Magnum handgun or test barrel. The use of a handgun with a 15 to 16.5 cm (6 to 6.5 in) barrel is suggested. Test bullets shall be 357 Magnum jacketed soft point, with nominal masses of 10.2 g (158 gr) and measured velocities of 425±15 m (1395±50 ft) per second.

5.2.3.2 Higher Velocity 9 mm: The test weapon may be a 9 mm handgun or test barrel. The use of a handgun with a 10 to 12 cm (4 to 4.75 in) barrel is suggested. Test bullets shall be 9 mm full metal jacketed, with nominal masses of 8.0 g (124 gr) and measured velocities of 358±12 m (1175±40 ft) per second.

5.2.4 Type III-A Test Weapons and Ammunition 5.2.4.1 44 Magnum: The test weapon may be a 44 Magnum handgun or test barrel. The use of a handgun with a 14 to 16 cm (5.5 to 6.25 in) barrel is suggested. Test bullets shall be 44 Magnum, lead semi-wadcutter with gas checks, nominal masses of 15.55 g (240 gr), and measured velocities of 426±15 m (1400±50 ft) per second.

5.2.4.2 Submachine Gun (SMG) 9 mm: The test weapon may be a 9 mm SMG or test barrel. The use of a test barrel with a 24 to 26 cm (9.5 to 10.25 in) barrel is suggested. Test bullets shall be 9 mm full metal jacketed, with nominal messes of 8.0 g (124 gr) and measured velocities of 426±15 m (1400±50 ft) per second.

5.2.5 Type III Test Weapon and Ammunition: The test weapon may be a rifle or a test barrel chambered for 7.62-mm (308 Winchester) ammunition. The use of a rifle with a barrel length of 56 cm (22 in) is suggested. Test bullets shall be 7.62 mm full metal jacketed (U.S. military designation M80) with nominal masses of 9.7 g (150 gr) and measured velocities of 838±15 in (2850±50 ft) per second.

5.2.6 Type IV Test Weapon and Ammunition: The test weapon may be a rifle or a test barrel chambered for 30-06 ammunition. The use of a rifle with a barrel length of 56 cm (22 in) is suggested. Test bullets shall be 30 caliber armor piercing (U.S. military designation APM2), with nominal masses of 10.8 g (166 gr) and measured velocities of 868±15 m (2850±50 ft) per second.

5.2.7 Special Type Test Weapon and Ammunition: The test weapon, cartridge type, bullet construction, bullet caliber, bullet mass, and bullet striking velocity must all be specified by the user.

5.2.8 Chronograph: The chronograph shall have a precision of 1 p.s and an accuracy of 2 us. Its triggering devices shall be of either the photoelectric or conductive screen type.

5.2.9 Support Fixture: The test specimen shall be supported by a fixture that penults its position and attitude to be readily adjusted so that it is perpendicular to the line of flight of the bullet at the point of impact.

5.2.10 Witness Plate: The witness plate shall be a 0.5 mm (0.020 in) thick sheet of 2024-T3 or 2024-T4 aluminum alloy and shall be placed and rigidly affixed perpendicular to the line of flight of the bullet and 15 cm (6 in) beyond the armor under test.

5.3 Ballistic Resistance Test: Condition the test specimen at a temperature of 20 to 28° C. (68 to 82° F.) for at least 24 h prior to test.

Figure 2:
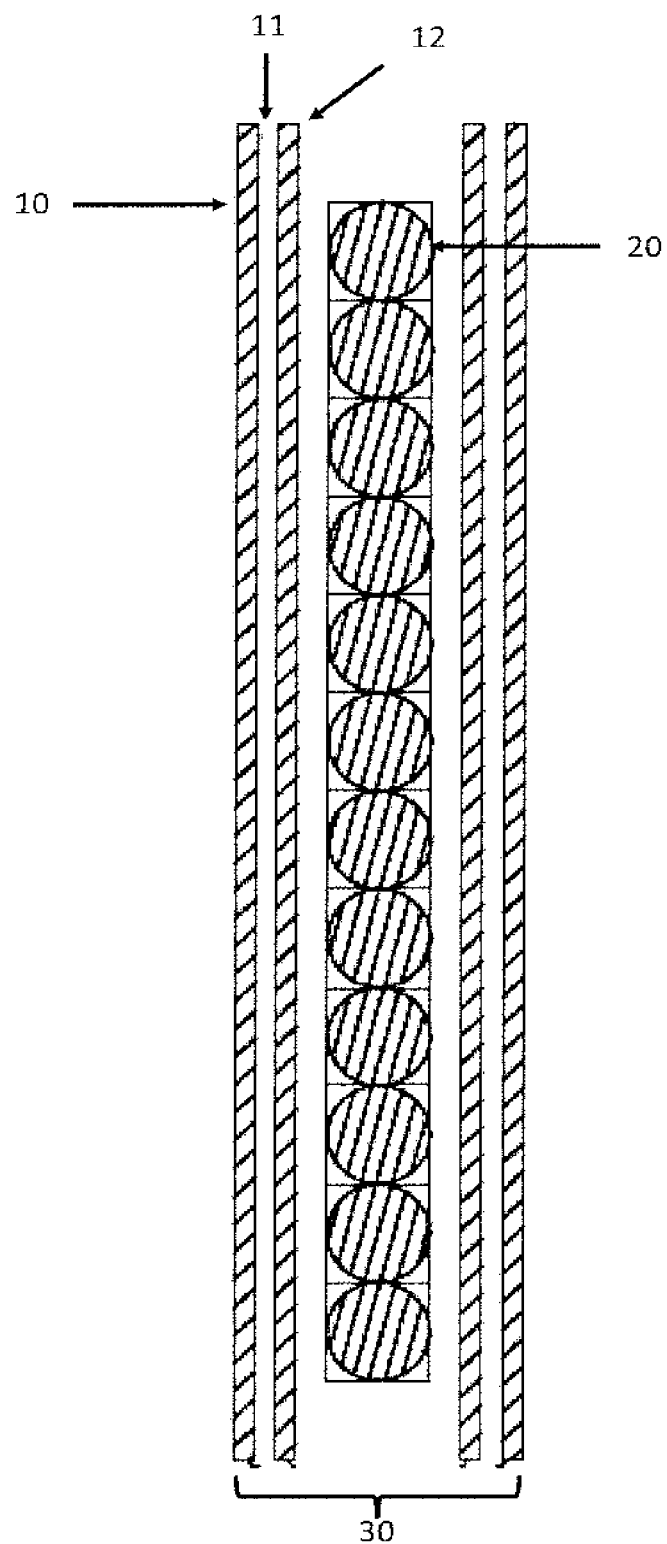
FIG. 2 shows a schematic diagram of the side view of a flexible ballistic armor unit 30. Each unit is comprised of multiple spherical units 20, an inner envelope 12, an outer envelope 10 and optionally an adhesive layer 11 between the inner envelope 12 and outer envelope 10.
Figure 3:
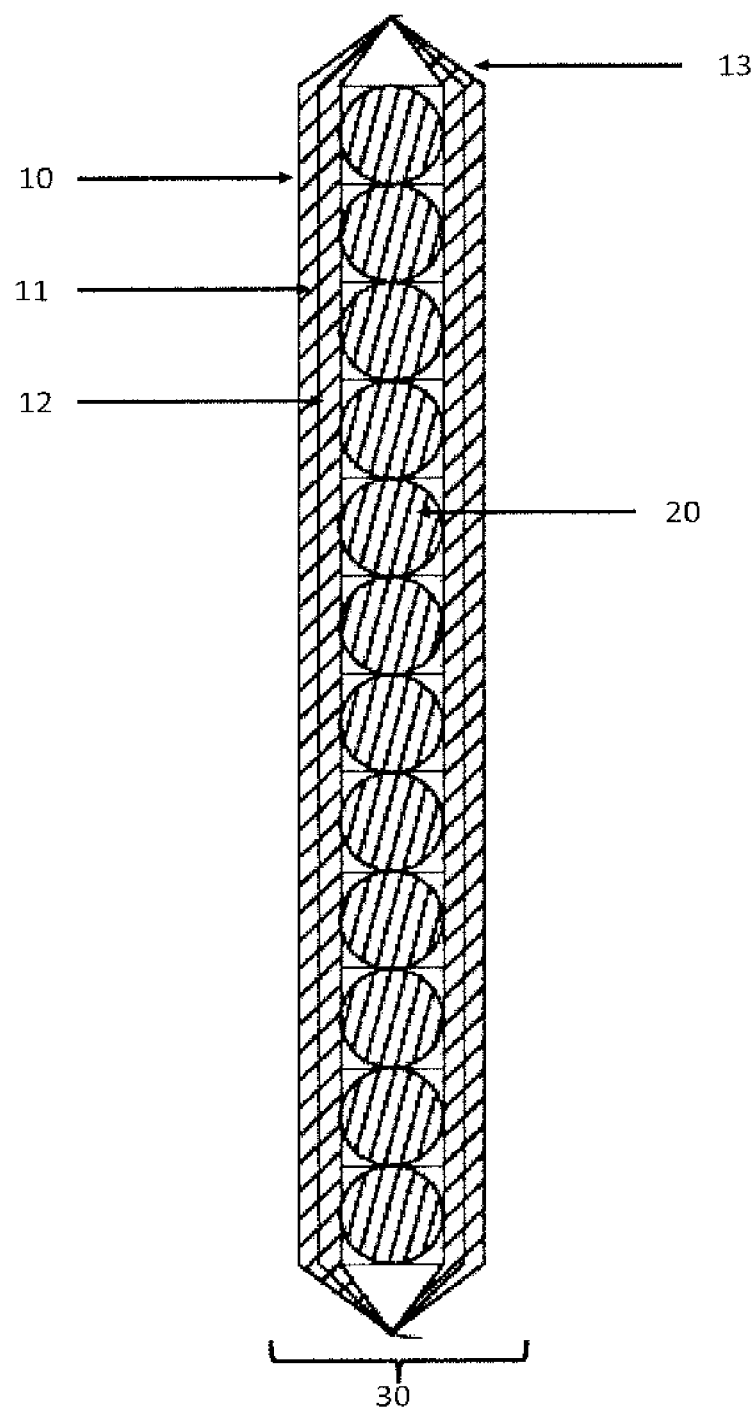
FIG. 3 shows a schematic diagram of the side view of a flexible ballistic armor unit 30. Each unit is comprised of multiple spherical units 20, an inner envelope 12, an outer envelope 10, optionally an adhesive layer 11 between the inner envelope 12 and outer envelope 10 and ballistic thread 13 at the end of the unit.
Figure 4:
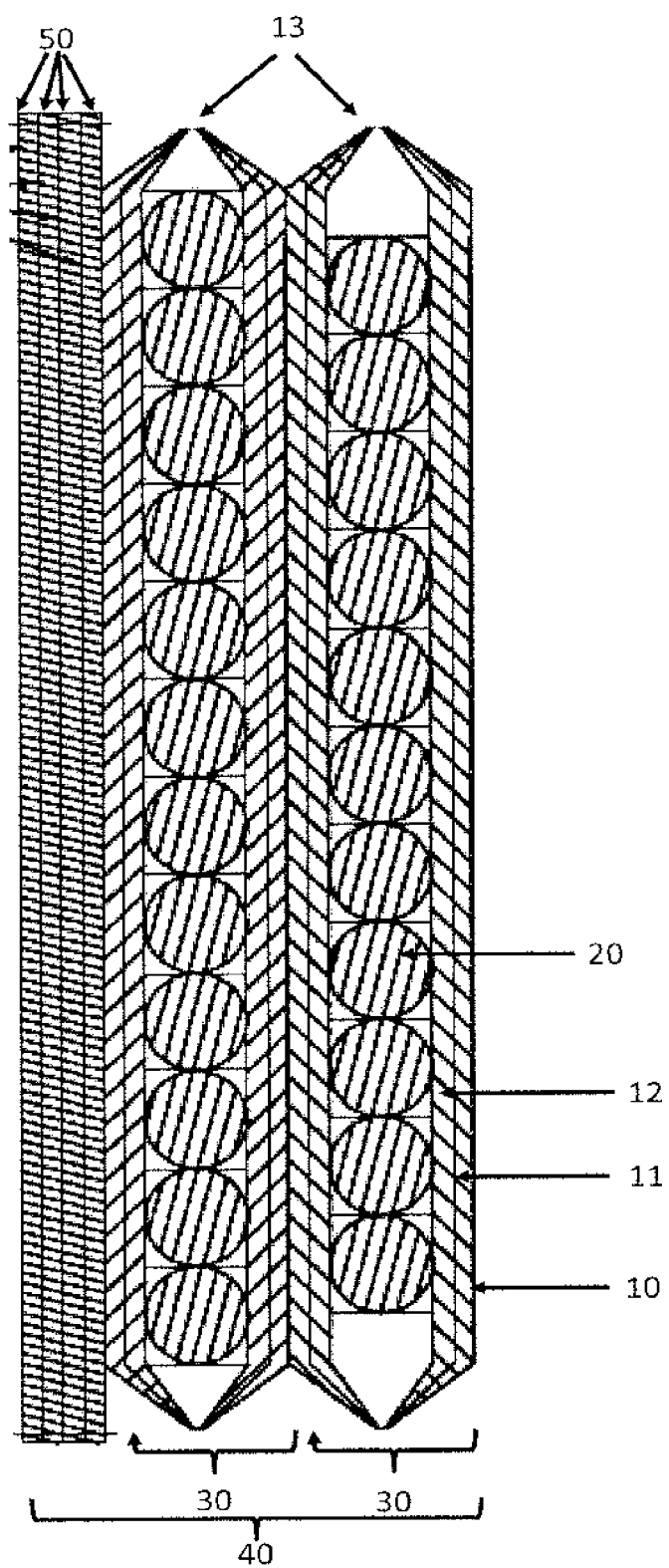
FIG. 4 shows a schematic diagram of the side view of two flexible ballistic armor units 30 with an optional fibrous fabric 50 consisting of a front plate. Each unit is comprised of multiple spherical units 20, an inner envelope 12, an outer envelope 10, optionally an adhesive layer 11 between the inner envelope 12 and outer envelope 10, ballistic thread 13 at the end of the unit and a front plate 5.

Place the triggering devices 2 and 3 m (6.6 and 9.8 ft), respectively from the muzzle of the test weapon as shown in FIG. 2, and arrange them so that they define planes perpendicular to the line of flight of the bullet. Measure the distance between them with an accuracy of 1.0 mm (0.04 in). Use the time of flight and distance measurements to calculate the velocity of each test round.

After the specified test weapon has been supported, leveled, and positioned, fire one or more pretest rounds (as needed) through a witness plate to determine the point of impact.

Place the test specimen in the support fixture and position it 5 m (16 ft) from the muzzle of the test weapon. Then position an unperforated witness plate 15 cm (6 in) beyond the test specimen. Fire a test round and record the velocity of the bullet as measured by the chronograph. Examine the witness plate to determine penetration, and examine the specimen to see if the bullet made a fair hit.

If no penetration occurred, reposition the test specimen and repeat the procedure with additional test rounds until the test is completed. Space the hits as evenly as possible so that every portion of the test specimen is subject to test.

This standard is a technical document that specifies performance and other requirements equipment should meet to satisfy the needs of criminal justice agencies for high-quality service. Purchasers can use the test methods described in this standard to determine whether a particular piece of equipment meets the essential requirements, or they may have the tests conducted on their behalf by a qualified testing laboratory. Procurement officials may also refer to this standard in their purchasing documents and require that equipment offered for purchase meet the requirements. Compliance with the requirements of the standard may be attested to by an independent laboratory or guaranteed by the vendor.

Because this NIJ standard is designed as a procurement aid, it is necessarily highly technical. For those who seek general guidance concerning the selection and application of law enforcement equipment, user guides have also been published. The guides explain in nontechnical language how to select equipment capable of performance required by an agency.

Although the invention has been described with reference to the above examples, it will be understood that modifications and variations are encompassed within the spirit and scope of the invention. Accordingly, the invention is limited by the following claims.

What is claimed is:

1. A flexible ballistic armor apparatus comprising at least two flexible ballistic armor units;
    each of the at least two ballistic armor units comprising:
    (i) a single row of spherical units comprising at least two spherical units arranged linearly,
    (ii) an inner envelope encasing the row of spherical units, and
    (iii) an outer envelope encasing the inner envelope,
    wherein the at least two ballistic armor units are attached parallel to one another,
    wherein each spherical unit is comprised of a fragmentation material,
    wherein each spherical unit is $5/8^{th}$ inch, and
    wherein each spherical unit is comprised of a fragmentation material selected from tempered amorphous silica, ceramic or amorphous silica fiber infused with a liquid metal, quartz hardened graphene wrapped in ceramic/glass, silicon carbide, carbon/carbon composites, carbon/carbon/silicon carbide composites, boron carbide, aluminum oxide, silicon carbide particulate/aluminum metal matrix composites, quartz, feldspar, magnesium, graphene, graphene compounds or a combination thereof.

2. The apparatus of claim 1, wherein each ballistic armor unit is arranged parallel to at least one ballistic armor unit, wherein the ballistic armor units are offset by 0-100% of the radius of a spherical unit, and wherein the at least two ballistic armor units are attached by ballistic thread.

3. The apparatus of claim 1, further comprising at least one layer of a fibrous fabric.

4. The apparatus of claim 3, wherein the fibrous fabric is aramid fiber.

5. The apparatus of claim 3, wherein the aramid fabric is coated with graphene.

* * * * *